United States Patent [19]

Cowie et al.

[11] 4,037,294
[45] July 26, 1977

[54] METHODS AND APPARATUS FOR FILLETING FISH

[75] Inventors: William Pirie Cowie, Aberdeen; Fraser Donaldson, New Deer; Geoffrey John Grantham, Aberdeen, all of Scotland

[73] Assignee: Lever Brothers Company, New York, N.Y.

[21] Appl. No.: 575,868

[22] Filed: May 9, 1975

[30] Foreign Application Priority Data

May 14, 1974 United Kingdom ............... 21221/74

[51] Int. Cl.² ............................................. A22C 25/16
[52] U.S. Cl. ...................................................... 17/56
[58] Field of Search ..................... 17/46, 52, 51, 56, 57

[56] References Cited

U.S. PATENT DOCUMENTS

| 1,639,976 | 8/1927 | Barry | 17/56 |
| 1,793,189 | 2/1931 | Peters | 17/56 |
| 2,932,060 | 4/1960 | Massengill | 17/46 |
| 3,052,914 | 9/1962 | Luedtke | 17/56 |
| 3,570,048 | 3/1971 | Michael | 17/56 |

FOREIGN PATENT DOCUMENTS

| 2,209,912 | 6/1973 | Germany | 17/56 |
| 289,540 | 2/1971 | U.S.S.R. | 17/56 |

Primary Examiner—Robert Peshock
Attorney, Agent, or Firm—Melvin H. Kurtz

[57] ABSTRACT

A method and device for filleting fish in which initial longitudinal cuts are made on each side of the backbone, and then ploughs are inserted into each of the cuts and draw a fillet clear on each side substantially free of pin bones.

10 Claims, 3 Drawing Figures

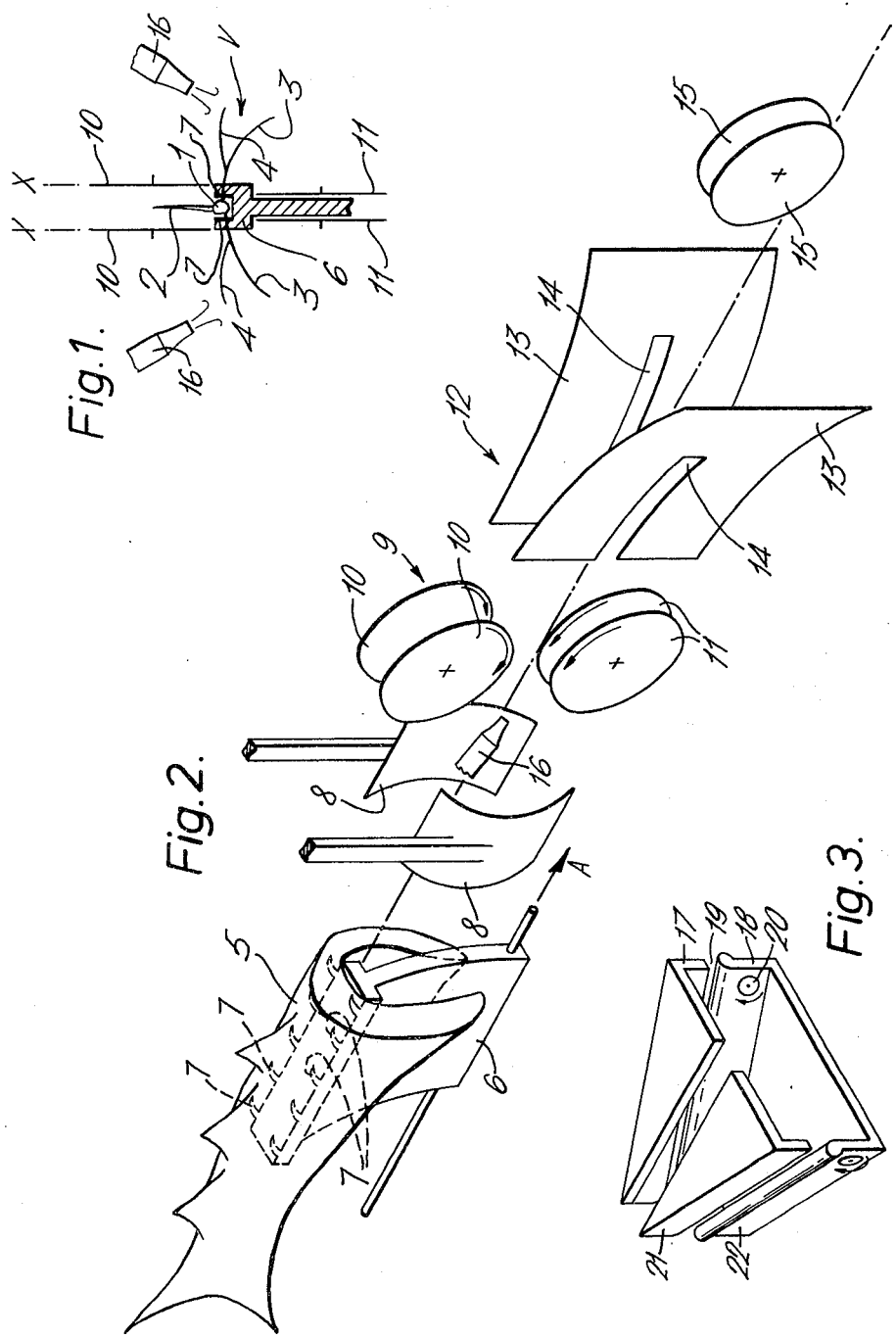

METHODS AND APPARATUS FOR FILLETING FISH

The present inventon relates to methods and apparatus for filleting fish, particularly round white fish, such as cod, haddock, coley, pollack and others of a similar bone structure.

Such fish possess a skeletal structure essentially composed of a vertebral column, or back bone, from which spines extend upwards (dorsal spines) and downwards (ventral spines). In the region of the belly, or gut, cavity there are no ventral spines. Instead the vertebrae spread over the top of the cavity for a short distance either side of the mid-line (the parapophyses) and at the terminations of the parapophyses are attached the rib bones which curve down to enclose the gut. Attached to these ribs are the pin bones which extend horizontally through the flesh to terminate at or near the skin.

The normal method of filleting such fish, by hand or machine, is to cut through the fish following the line of the bones from the dorsal to ventral fins, passing over the ribs and severing the connections between the pin bones and the ribs. The fillets so produced, therefore, contain a line of pin bones.

Most known filleting machines remove fillets containing pin bones which have subsequently to be removed by hand for the manufacture of bone-free fish products. There are filleting machines capable of producing bone-free fish fillets, but the yield is substantially lowered since the whole belly flap is cut off to ensure complete removal of the pin bones. The flesh of the belly flap is usually recovered in a minced form after its passage through some type of bone separator. We have realised that fillets, substantially free of pin bones, can be produced by machine with substantially no loss in yield over existing machines and in many cases with a considerable increase in yield. Instead of the fillet being cut from the rib bones as is done in present methods our method removes the fillets by a pulling or ploughing operation.

Accordingly the invention provides a method of filleting fish comprising the steps of making a pair of initial longitudinal cuts into the fish one on each side of, closely adjacent, and parallel to the vertebral column of the fish to be filleted, which cuts pass down through the skin towards but not into the parapophyses, accommodating ploughs in each of said initial cuts, and by relative movement between the ploughs and the fish, drawing a side fillet clear of the main bone structure on each side of the fish.

Normally the fish to be filleted will be gutted and preferably deheaded. The initial longitudinal cuts should be as close to the dorsal spines as is practical without cutting into the bone.

In a preferred method each of the ploughs has a slot starting from its leading edge. The slot is located so as to accommodate the rib and pin bones during filleting. This enables a wide area of the plough to get underneath the fish flesh and draw the fillet off the rib and pin bones.

Preferably the fish is moved head end first relative to the ploughs. This is convenient since the bones then lie in a direction where it is easiest to draw the fillet clear of the bone structure.

Preferably the ploughs are outwardly divergent. Then as the fish progresses relative to the surfaces of the ploughs, the divergence pulls the flesh away from the skeleton of the fish; the rib and pin bones still attached to the skeleton pull back through the slots in the plates, and the flesh is thus pulled off these bones. Thus the fillet is freed from the skeleton essentially bone-free while a section of muscle is left attached to the skeleton between the rib and pin bones.

The plough is conveniently a plate of suitable shape to provide plough surfaces each side of the pin bone slot. More complex arrangements can be used in which the plough may comprise two parts, each providing a plough surface and there being a slot between said surfaces. Conveniently the slot may be of variable width, for example by the two parts being spring loaded together at one or both ends of the slot, and this gives greater efficiency - more pin-bone-free operation - with different sized fish.

Additionally, we have appreciated that in a ploughing operation the pin bone/rib bone is attached at both ends. Internally it is attached to the back bone and externally the outer extremity of the pin bone is connected by various tissues to the skin of the fish. For a satisfactory ploughing operation, the force to overcome the back bone connection has to be greater than that to overcome the skin connection, otherwise the pin bones remain in the fillets. In almost all cases this condition is met and satisfactory pin bone free fillets are achieved, but fish quality and physical properties vary widely, dependent on where the fish is caught and how it is stored subsequently.

To fillet fish consistently even when difficult conditions are encountered, we have provided an additional optional measure. This is to apply a localized treatment to the fish along the zone - usually a narrow strip - where the pin bones are connected to the fish skin. This treatment should weaken or destroy the skin connection and is applied preferably by heat such as steam. The heat should locally destroy the pin bone connection to the skin, but should not be excessive otherwise risk of damage to the surrounding fish can arise.

The invention also provides an apparatus for filleting fish comprising a carrier saddle to carry the fish in the machine, a pair of cutter knives located to make initial longitudinal cuts one on each side of, closely adjacent, and parallel to the vertebral column of a fish located on said carrier saddle, and a pair of ploughs each located and arranged to enter into one of said cuts during movement of the carrier relative to said ploughs and then to draw a side fillet clear of the bone structure of the fish on said carrier.

The fish is located on the carrier saddle preferably head end first. This saddle carries the fish through the ploughs. This is the opposite direction of feeding from that used in most conventional filleting machines, which generally present the fish tail first. Our preferred method of feeding the fish is advantageous when using ploughs in view of the disposition of the rib and pin bones. The fish should be located with the air bladder of the fish resting on the saddle, and with the hooks located against the vertical parapophyses to ensure firm anchoring.

The function of the initial longitudinal cuts of the fish is to perform the initial part of the filleting process by severing the skin and flesh from the dorsal spines. Posterior to the gut cavity, the flesh must be separated from the dorsal and ventral spines. This can be achieved using either the same pair of cutter knives as is used for the initial cut, a separate pair of knives or the ploughs if suitably sharpened. The ploughs may be plain sheets of metal and preferably the plough in each case has a slot starting at a leading edge of the sheet and located to accommodate the ribs. The width of the slot will depend on the particular fish to be filleted and in the case of small cod should desirably be about 5 – 7.5 mm. The ploughs should preferably be shaped so as to smoothly diverge, on each side, outwards from the relative path of the saddle carrier. Alternatively, as previously mentioned, a convenient arrangement of complex plough may be used where the slot is variable in width in use.

Reference is made to relative movement between the ploughs and the fish or saddle since either can be stationary while the other moves, or both may move, to provide the relative movement between the two. In practice it is more convenient to move the saddle or fish and retain the ploughs and knives in stationary locations.

An embodiment of the invention will now be described by way of example with reference to the accompanying drawings in which:

FIG. 1 is an end elevation in the region of the belly cavity of the fish on the saddle;

FIG. 2 is an isometric diagram of the layout of the machine; and

FIG. 3 is a view of an alternative plough arrangement.

Referring to FIG. 1 the skeletal structure of a cod is shown which consists essentially of a backbone 1, a dorsal bone structure 2, extending vertically upwards from the backbone, rib bones 3 extending laterally as a rib cage from the back bone, and pin bones 4 which are connected to an intermediate position of the rib bones. Other round white fish have a similar skeletal structure.

As will be appreciated a fillet cut from the dorsal fin to and along the rib cage will inevitably contain pin bones. The present invention inter alia enables such fillets to be removed without pin bones in them.

An apparatus for achieving this is schematically shown in isometric form in FIG. 2. A deheaded gutted fish 5 is located on a travelling saddle 6 with its head end leading in the direction of travel A. A series of forwardly directed projections 7 on the upper surface of the saddle hook against the vertical parapophyses to ensure firm location, and the air bladder rests on the saddle within these projections. The way these projections locate relative to the bone structure can be seen in FIG. 1, and it will be seen from FIG. 2 that the saddle is rearwardly shaped to enable adequate penetration into the belly cavity to achieved.

Once firmly located on the saddle, the fish is successively and continuously fed past a series of stages. The saddle, of which there will be a series on a continuous band drive, moves through the various stages continuously at constant speed, for example at about ½ metre per second or 38 saddles per minute. At the first of these a pair of spring biased self controlling guides 8 firmly centralise and align the fish for the subsequent operations. At a cuttinng stage 9 upper parallel rotary cutter knives 10 make an upper initial longitudinal cut each side of, and closely adjacent (about 6 mm blade spacing) the dorsal bone structure while lower parallel blades 11 more closely spaced (about 4.5 mm) make cuts on the underside of the fish either side of the ventral bone structure (the spatial location of these blades can best be seen in FIG. 1). The blades rotate in a reverse sense, peripherally, to the conveying direction to ensure that during cutting the fish is stretched out and an accurate cut without distortion or curling of the fish can be achieved. Blades of 200 mm diameter rotating at 850 Rpm have been found satisfactory.

The fish is then fed to a plough filleting stage 12. At this stage a pair of initially parallel divergent plates 13 is located to fit into the cuts initiated at the cutting stage 9. Each plate has a slot 14 starting from its leading edge and located to accommodate the rib bones. In the case of small cod these slots need to be about 5 mm in width. The leading edge of each plate is initially in the plane X—X of the knives 10 (see FIG. 1) and the plate then diverges smoothly to draw the fillets outwards from the line of movement of the saddle carrier. These fillets are then collected for further processing.

Subsequently the remaining frame of the fish is fed past a trimming station where a pair of trimmer knives 15 remove the V-sections of fish V between the pin bones and the rib bones. This small section then has the fish flesh separated from the severed pin and rib bones by threshing.

As an optional feature of the machine and filleting process, a pair of steam jets 16 are located to locally weaken the connection between the pin bone extremity and the fish skin. This measure gives greater filleting consistency in regard to pin bone free fillets, in the case of difficult fish.

FIG. 3 shows an alternative form of plough arrangement where each plough is formed of two separate parts 17 and 18, of which the upper part 17 has a plough surface 21 and is in a fixed location, and the lower part 18 (the part for each side being integral) is pivotably mounted at 20 against a spring bias and has on each side a plough surface 22. Between the two plough surfaces on each side is a slot 19 whose width is variable in use as from the entry end (i.e. the end farthest from the pivots). The slot is spring biased to its narrowest position but in use the presence of bones will force the slot open sufficiently to accommodate these bones without damage, thus the slot width can vary between 5 and 7.5 mm.

In other embodiments both ends of the slot can be variable in width against spring bias.

What is claimed is:

1. A method of filleting fish comprising the steps of making a pair of initial longitudinal cuts into the fish one on each side of, closely adjacent, and parallel to the vertebral column of the fish to be filleted, which cuts pass down through the skin towards but not into the parapophyses, accommodating ploughs in each of said initial cuts, and by relative movement between the ploughs and the fish, drawing a side fillet clear of the rib and pin bones and main bone structure on each side of the fish.

2. A method according to claim 1 in which ploughs are used each of which has a slot starting from its leading edge, and located to accommodate the rib and pin bones during filleting.

3. A method according to claim 2 in which each plough used includes two plough surfaces with a slot therebetween, which slot is variable in width during use.

4. A method according to claim 1 in which the attachment of the pin bones to the skin is weakened by localized treatment to ensure that when drawing the fillets clear of the skeleton the pin bones remain with said skeleton.

5. A method according to claim 4 in which the treatment is applied by means of steam.

6. An apparatus for filleting fish comprising a carrier saddle to carry the fish in the machine, a pair of cutter knives located to make initial longitudinal cuts one on each side of, closely adjacent, and parallel to the vertebral column of a fish located on said carrier saddle, and a pair of ploughs each located and arranged to enter into one of said cuts during movement of the carrier relative to said ploughs and then to draw a side fillet clear of the rib and pin bones and main bone structure of the fish on the said carrier.

7. Apparatus according to claim 6 in which each plough includes a slot to incorporate the rib and pin bones during filleting.

8. Apparatus according to claim 7 in which each plough includes two plough surfaces with a slot therebetween of variable width.

9. Apparatus according to claim 6 comprising treatment means for applying a localised treatment to the fish at the points where the pin bones are attached to the skin, prior to removal of the fillets from the bone structure.

10. Apparatus according to claim 9 in which said treatment means includes at least one steam jet.

* * * * *